United States Patent [19]
Numazaki

[11] Patent Number: 5,430,284
[45] Date of Patent: Jul. 4, 1995

[54] BAR CODE READING APPARATUS CAPABLE OF READING BAR CODES HAVING LONG AND SHORT BARS

[75] Inventor: Yoshihisa Numazaki, Toyokawa, Japan

[73] Assignee: Nippondenso Co., Ltd., Kariya, Japan

[21] Appl. No.: 151,038

[22] Filed: Nov. 12, 1993

[30] Foreign Application Priority Data

Nov. 13, 1992 [JP] Japan ................... 4-303889

[51] Int. Cl.$^6$ ............................................. G06K 7/10
[52] U.S. Cl. ................................. 235/462; 235/472
[58] Field of Search ............. 235/472, 462, 463, 436, 235/437, 440, 494, 438, 455, 456

[56] References Cited

U.S. PATENT DOCUMENTS

| | | | |
|---|---|---|---|
| 3,790,756 | 2/1974 | Graves et al. | 235/462 X |
| 3,796,862 | 3/1974 | Asija | 235/462 |
| 4,320,911 | 4/1989 | Arackellian et al. | 235/467 |
| 4,641,018 | 2/1987 | Mazumder et al. | 235/494 X |
| 4,675,531 | 6/1987 | Clark et al. | 234/472 X |
| 4,734,566 | 3/1988 | Senda et al. | 235/455 |
| 5,073,954 | 12/1991 | Van Tyne et al. | 235/463 X |
| 5,118,369 | 6/1992 | Shamir | 235/462 X |

FOREIGN PATENT DOCUMENTS 61-289470 12/1986 Japan.

*Primary Examiner*—John Shepperd
*Assistant Examiner*—Michael G. Lee
*Attorney, Agent, or Firm*—Cushman, Darby & Cushman

[57] ABSTRACT

A bar code reader is provided which is designed to read a bar code carrying information according to a combination of lengths of bars of the code. The bar code reader includes a light source for radiating light onto the bar code, a light gathering system for gathering the light reflected from the bar code to compress the gathered light at a preselected rate in a lengthwise direction of the bars, a photoelectric converter, responsive to the light compressed by the light gathering system, for providing a signal having a level corresponding to a degree of intensity of the compressed light, and a bar code information reading unit, responsive to the signal from the photoelectric converter, for reading the information carried by the bar code. With this arrangement, the bar code may be read in a one-time scanning operation completely regardless of a type of image sensor: one-dimensional or two dimensional sensors.

18 Claims, 9 Drawing Sheets

BAR CODE READING APPARATUS CAPABLE OF READING BAR CODES HAVING LONG AND SHORT BARS

BACKGROUND OF THE INVENTION

1. Technical Field of the Invention

The present invention relates generally to a bar code reading apparatus, and more particularly to an improved bar code reading apparatus which is operable to optically compress a bar code carrying information provided with a combination of lengths of bars of the code. This apparatus therefore allows the compressed bar code to be read completely in a one-time scanning operation.

2. Background Art

Figure 2:
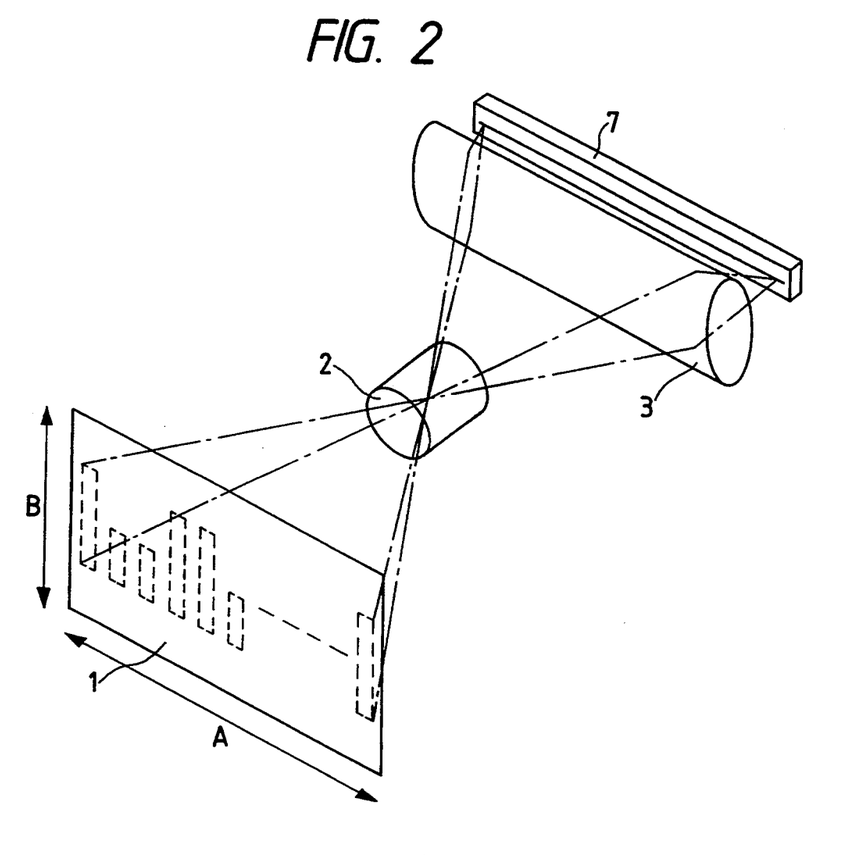
FIG. 2 is a perspective view which shows arrangements of a bar code and an image sensor.

A postal bar code, as shown in FIG. 2, which is commonly employed in a U.S. post office network system is well known. This postal bar code 1 is designed to carry information formed with a combination of different lengths of a plurality of bars. The widths and spaces of the bars do not carry information at all.

Figure 15:
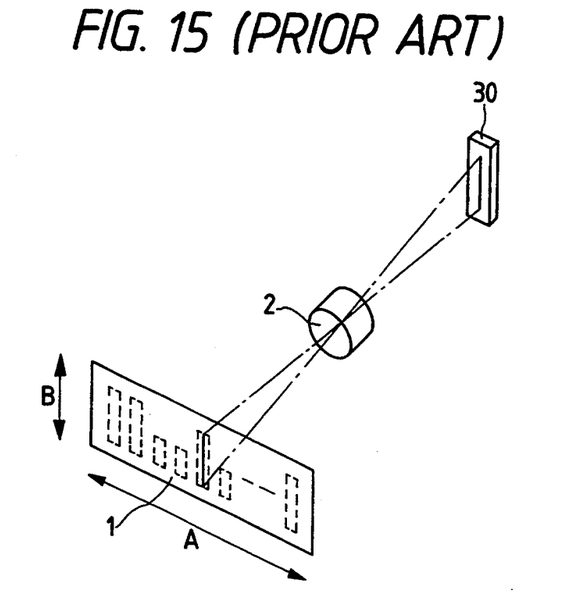
FIGS. 15 and 16 are perspective views which shows prior art bar code readers, respectively.

For reading such a bar code, a bar code reader, as shown in FIG. 15, has been proposed in the art. This bar code reader includes a one-dimensional photoelectric converter 30 (i.g., a CCD linear image sensor) with an array of photosensitive elements being oriented parallel to the length of the bar of the code and an image-forming lens 2 operable to image the bar code on the photoelectric converter 30. When reading bar code Information, by carrying either an object such as mail on which the bar code is printed or sweeping the bar code reader in a width direction of the bar code, the photoelectric converter 30 receives light reflected from each bar to determine the length of the bar based on the degree of intensity of the reflected light.

Figure 16:
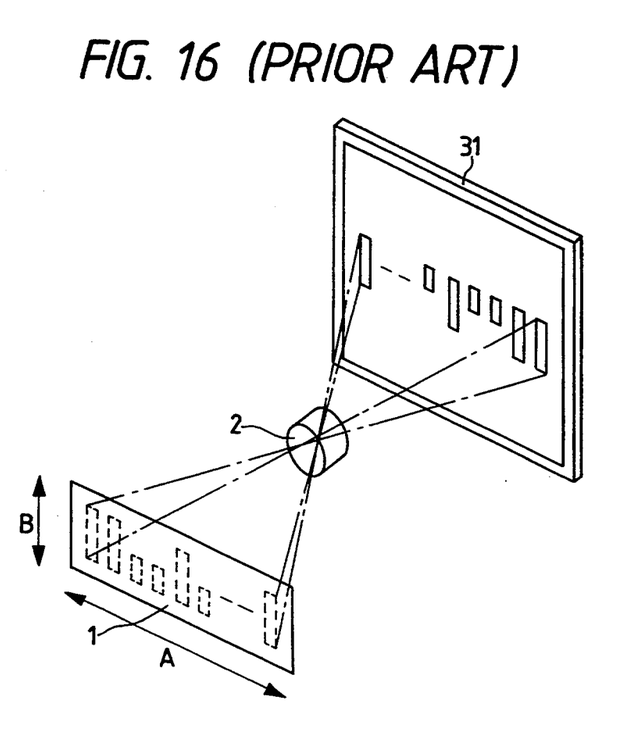

Another bar code reader such as shown in FIG. 16 is also well known. This bar code reader includes a two-dimensional photoelectric converter 31 (i.g., a CCD area image sensor) which receives the entire bar code image to determine a combination of the lengths of the bars.

The above former prior art bar code reader, however, encounters a drawback in that in order to read the entire image of the bar code, it is necessary to move either the object disposing thereon the bar code or the photoelectric converter 30, resulting in an increased readout period of time.

Additionally, in the latter prior art bar code reader, although a time period required for reading the bar code completely is short, an expensive device such as the two-dimensional photoelectric converter 31 is necessary. Such a device increases the manufacturing costs of the whole system.

SUMMARY OF THE INVENTION

It is therefore a principal object of the present invention to avoid the disadvantages of the prior art.

It is another object of the present invention to provide an economical bar code reader which is capable of reading a bar code including a plurality of different lengths of bars within a short period of time.

According to one aspect of the present invention, there is provided a bar code reading apparatus which comprises a light radiating means for radiating light onto a bar code including a plurality of bars which carry information represented by a combination of lengths of the bars, a light gathering mechanism for gathering the light reflected from the bar code and for compressing the gathered light at a preselected rate in a lengthwise direction of the bars, a photoelectric conversion mechanism which is responsive to the light compressed by the light gathering mechanism for providing a signal having a level corresponding to a degree of intensity of the compressed light, and a bar code information readout mechanism which is responsive to the signal from, the photoelectric conversion mechanism for reading the information carried by the bar code.

According to another aspect of the invention, there is provided a bar code reading apparatus which comprises a light radiating mechanism for radiating light onto a bar code including a plurality of bars which carry information represented by a combination of lengths of the bars, and a light gathering mechanism for gathering the light reflected from the bar code to compress the gathered light at a preselected rate in a lengthwise direction of the bars. This aspect of the bar code ready apparatus also comprises a photoelectric conversion mechanism which is responsive to the light compressed by the light gathering mechanism for providing a signal having a level corresponding to a degree of intensity of the compressed light, a bar code information readout mechanism responsive to the signal from the photoelectric conversion mechanism for reading the information carried by the bar code, and a determining mechanism for determining whether the bars of the bar code are arranged in given order or not based on the light reflected from the bar code and for providing a signal indicative thereof.

According to a further aspect of the invention, there is provided a bar code reading apparatus designed to read a bar code which carries information represented by a combination of different lengths of bars of the bar code, which comprises a light compressing mechanism for compressing light which is reflected from the bar code, at a preselected rate in a lengthwise direction of the bars, a photoelectric conversion mechanism, responsive to the light compressed by the light compressing mechanism, for providing a signal having a level corresponding to a degree of intensity of the compressed light, and a bar code information readout mechanism for reading the information carried by the bar code based on a variation in level of the signal from the photoelectric conversion mechanism.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIGS. 6(a), 6(b), 6(c), 6(d), and 6(e) show relationships among the lengths of bars of a bar code and signals provided by an image sensor, a follow-up signal generating circuit, a comparator, a single pulse generating circuit, and a sample and hold circuit.

DESCRIPTION OF THE PREFERRED EMBODIMENT

Figure 1:
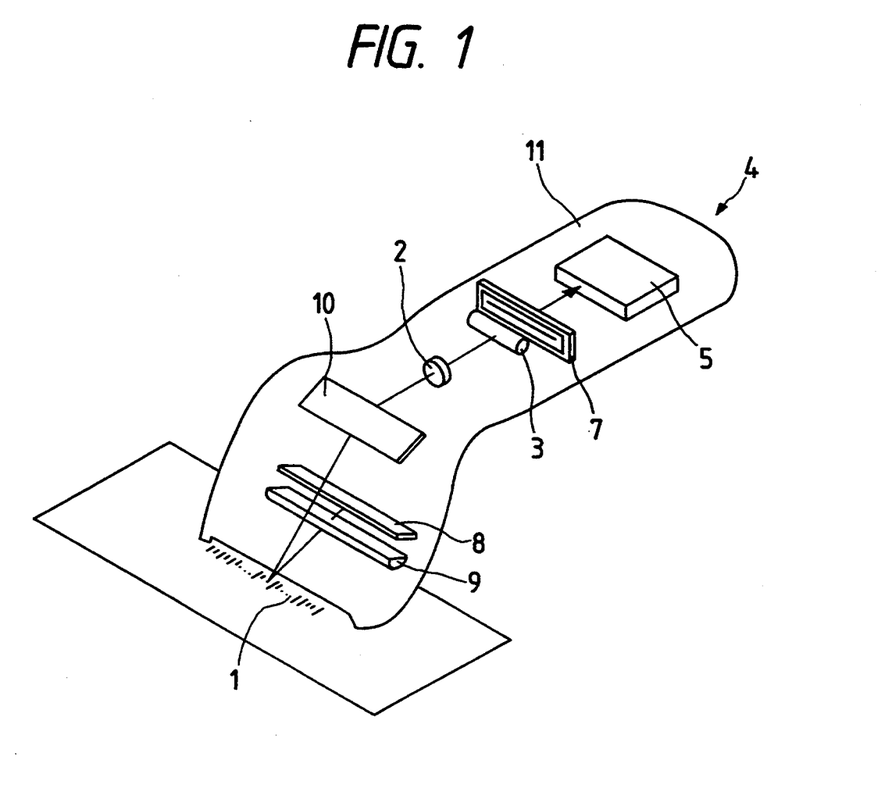
FIG. 1 is a perspective view which shows a bar code reader according to the present invention.

Referring now to the drawings, wherein like numbers refer to like parts in several views, particularly to FIG. 1, there is shown a portable bar code reader 4 according to the present invention which is designed to read a bar code 1, such as a postal bar code which is usually printed on mail for the purpose of automatic delivery. The bar code 1 is, as can be seen in the drawings, provided with a plurality of bars having different lengths which carry delivery zone information, for example. This type of bar code provides the advantage in that, when reading bar codes printed on mail which is being carried by a transport device such as a belt conveyer, bar code information may be read out with high accuracy even when a carrying speed is changed since the widths and spaces of bars of the code carry no information.

The bar code reader 4 includes generally a casing 11, an image sensor 7, an image-forming lens 2, an LED module 8, a lighting lens 9, a mirror 10, a condenser lens 3, and an electronic control unit (ECU) 5. The image sensor 7 is provided with a one-dimensional photoelectric converter which includes a plurality of light sensitive elements arranged on a straight line extending parallel to the center line of the condenser lens 3. The condenser lens 3, as shown in FIG. 2, includes a cylindrical lens which is designed to direct light reflected from each bar along the length thereof (i.e., an arrow B) onto the image sensor 7. The image-forming lens 2 serves to image the bar code 1 on a surface of the image sensor 7. The LED module 8 includes a plurality of light emitting diodes arranged parallel to each other for radiating optical beams onto the bar code along a scan path. The lighting lens 9 is located in front of the LED module 8 to focus the beams emitted from the LED module 8 on the bar code 1. The mirror 10 is arranged to direct the beams reflected from the bar code 1 to the image sensor 7 through the lenses 2 and 3 along a given optical path. The image sensor 7 is responsive to the reflected beams to convert them into electric signals, and provides same to the ECU 5. The ECU 5 then reads the bar code information out of the signals from the image sensor 7.

In operation, when beams are radiated from the LED module 8 to the bar code 1 through the lighting lens 9, the beams are then reflected on the bar code 1 so that they go to the image-forming lens 2 through the mirror 10. The image-forming lens 2 scales down, or compress the entire image of the bar code 1 by a preselected percentage to project it to the condenser lens 3. The condenser lens 3 further compress the image of the bar code 1 by a given rate so that the lengths of the bars of the code are decreased, and projects it to the image sensor 7.

Figure 3A:
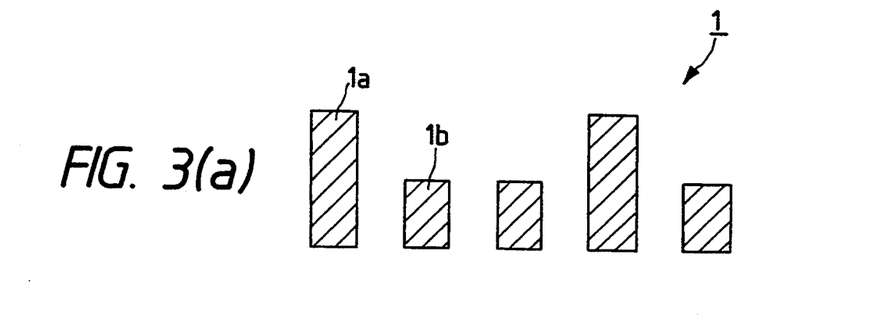
FIG. 3(a) is an illustration which shows an array of bar codes.
Figure 3B:
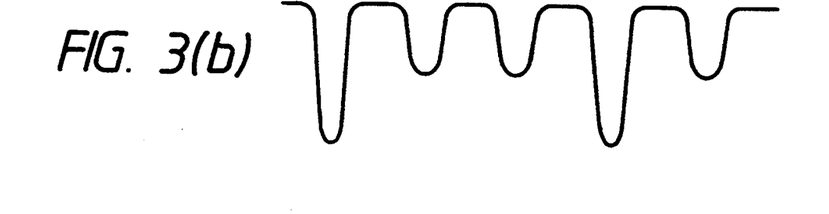
FIG. 3(b) is an illustration which shows a variation in amplitude of an analog signal output from an image sensor to an ECU.

Referring to FIG. 3(a), there is shown the bar code 1 which includes a combination of long and short bars 1a and 1b. Usually, bars are printed black so that they assume a lower reflectivity. It will be noted that in the bar code shown, a colored area of the long bar 1a is greater than that of the short bar 1b. Accordingly the degree of light intensity of a beam reflected over the length of the long bar 1a becomes lower than that of the short bar 1b. The image sensor 7 is, therefore, responsive to the light beams reflected over the lengths of the bars 1a and 1b to provide an analog signal, as shown in FIG. 3(b), having different amplitudes. Thus, a high level signal is provided in response to the beam reflected from the short bar 1b, while a low level signal is provided in response to the beam reflected from the long bar 1a. The ECU 5 receives the signal from the image sensor 7 to read the bar code information and transmits same to external devices (not shown).

Figure 4:
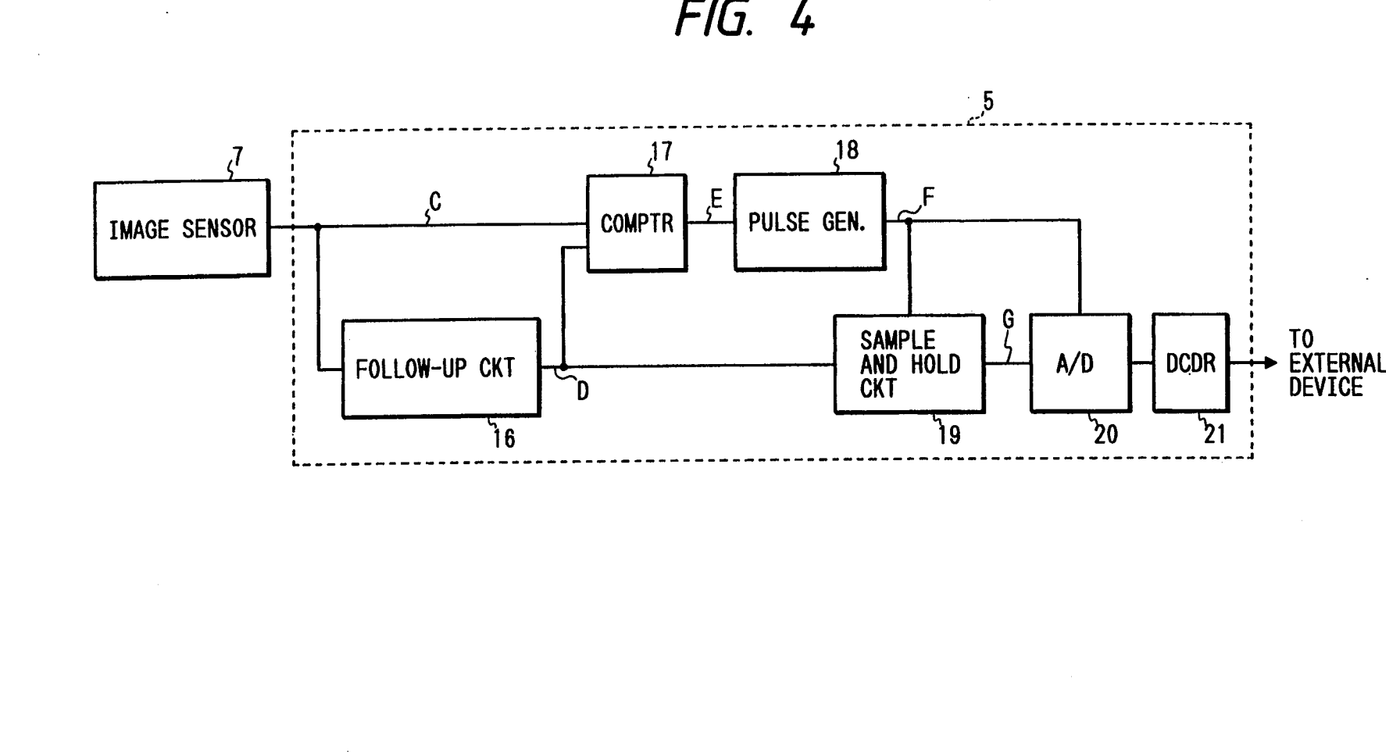
FIG. 4 is a block diagram which shows circuit elements of an ECU.
Figure 5:
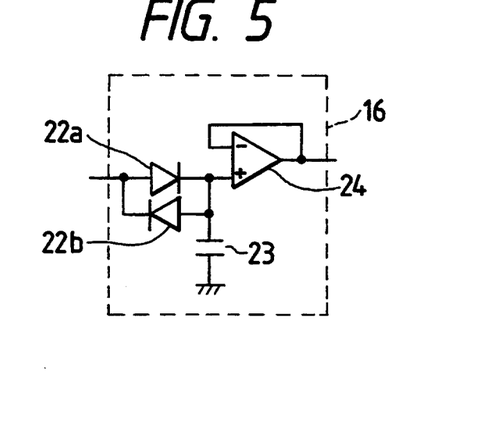
FIG. 5 is a circuit diagram which shows a follow-up signal generating circuit.

Referring to FIG. 4, there is shown a circuit diagram of the ECU 5. The ECU 5 includes a follow-up signal generating circuit 16, a comparator 17, a single pulse generating circuit 18, a sample and hold circuit 19, an A/D converter 20, and a decoder 21. The follow-up signal generating circuit 16, as shown in FIG. 5, includes diodes 22a and 22b, a capacitor 23, and an operational amplifier 24.

Figures 6A, 6E:
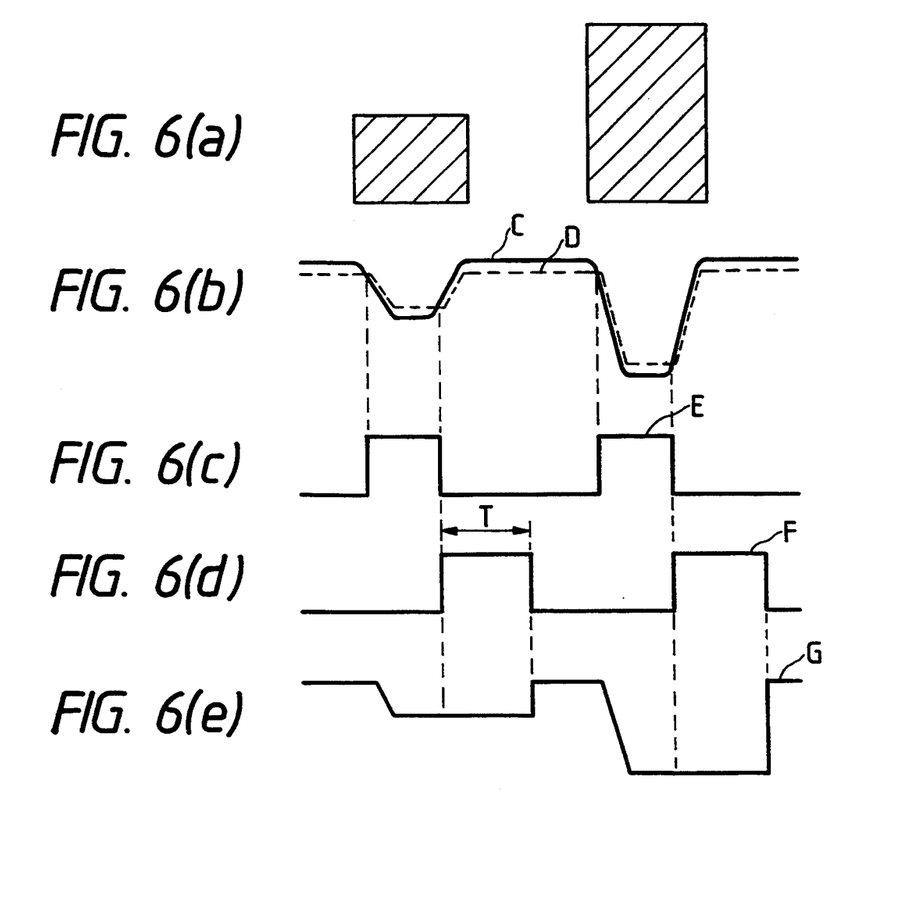

In operation, the image sensor 7 provides the analog signal C, as shown by a solid line in FIG. 6(b), having the high and low levels corresponding to the lengths of the bars of the code respectively, as shown in FIG. 6(a). This signal C will cause the follow-up signal generating circuit 16 to produce a follow-up signal D, as shown by a broken line in FIG. 6(b), which follows a variation in level of the analog signals C. The comparator 17 then compares the analog signal C from the image sensor 7 with the follow-up signal D from the follow-up generating circuit 16 to provide a binary signal E, as shown in FIG. 6(c). The single pulse generating circuit 18 is responsive to the binary signal E to provide a single pulse signal F, as shown in FIG. 6(d), which has a pulse width representing a high level for a preselected time interval T from the trailing edge of a pulse of the binary signal E.

The sample and hold circuit 19 is responsive to the pulse signal F from the signal pulse generating circuit 18 to hold the level variation of the follow-up signal D from the follow-up signal generating circuit 16 for the time interval T, and outputs a sample-and-hold signal G, as shown in FIG. 6(e). The A/D converter 20 is triggered by the single pulse signal F to convert the sample-and-hold signal G into a digital signal which is, in turn, inputted to the decoder 21 so that the digital signal is decoded and is outputted to the external devices.

With the above arrangements, the bar code information is, as stated above, convened into a signal producing a level variation corresponding to a difference in length between the bars of the bar code 1. Thus, with a one-time light-receiving operation of the image sensor 7, the information of the bar code 1 is read completely.

A modification of the above first embodiment will be described below.

The single pulse generating circuit 18 and the sample and hold circuit 19 of an ECU may be omitted when a high-speed A/D converter is used which is capable of processing data at a much higher speed than that of the variation in level of the follow-up signal D. In this arrangement, the A/D converter converts the follow-up signal D into a digital signal with timing where a trailing edge of the binary signal E when a change from the bar to the space of the code occurs is detected. In addition, another suitable electronic circuit operable to determine a variation in level of a signal may be used in place of the A/D converter.

Additionally, when the sample and hold circuit 19 having a quick sampling response rate is utilized, the single pulse generating circuit 18 may be omitted and the sample and hold circuit 19 may be controlled based on the binary signal E output from the comparator 17.

Further, a high speed A/D converter may alternatively be used as A/D converter 19, where processing data at a speed much higher than the variation in level of the analog signal C is possible. With such an A/D converter follow-up signal generating circuit 16, the comparator 17, the single pulse signal generating circuit 18, and the sample and hold circuit 19 may be omitted. In this arrangement, the analog signal C is substantially continually converted to a digital signal. The decoder 21 then detect a change from a bar to a space of the bar code to determine the length of each bar of the code.

Figure 7:
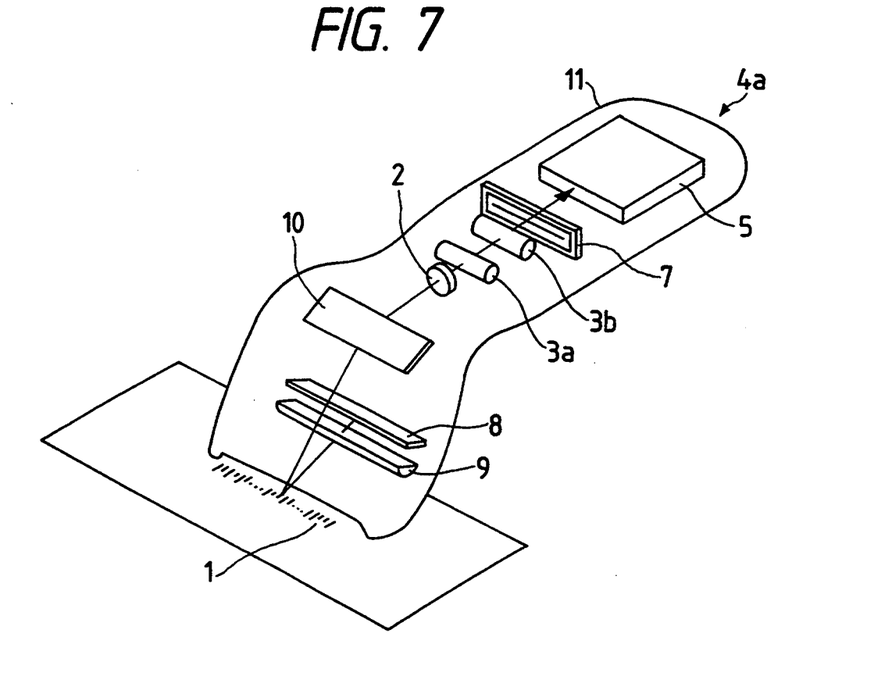
FIG. 7 is a perspective view which shows a second embodiment of a bar code reader according to the present invention.

Referring to FIG. 7, there is shown a second embodiment of the present invention. The reference numerals employed in FIG. 1 are carried over to FIGS. 7 and FIGS. 8 to 13, as will be described hereinafter in detail, for common structural elements.

A bar code reader 4a includes a pair of cylindrical condenser lenses 3a and 3b which are designed to amplify a difference in amount of light between light beams reflected from the long and short bards 1a and 1b, as shown in FIG. 6(a).

The cylindrical condenser lenses 3a and 3b are arranged parallel to an array of the light-sensitive elements disposed on the image sensor 7. The reflected light beams extending along the lengths of the bars of the bar code 1 through the image-forming lens 2 is initially gathered by the condenser lens 3a. That amount is in turn, focused by the condenser lens 3b onto the image sensor 7 completely. In other words, the condenser lens 3a serves to collect as much of the reflected light beams including components which would be scattered out of an imaging optical path as possible to focus these onto the image sensor 7 in cooperation with the activity of the condenser lens 3b.

Therefore, much more of the light beams which are reflected over the lengths of the bars of the code 1 on the light-sensitive elements of the image sensor 7 are collected in this second embodiment than in the above first embodiment. Thus a difference in light intensity is increased between the beams reflected from the long and short bars 1a and 1b, thereby assuring the ability of the bar code reader 4a to read the bar code 1, even if it is somewhat blemished.

Figure 8:
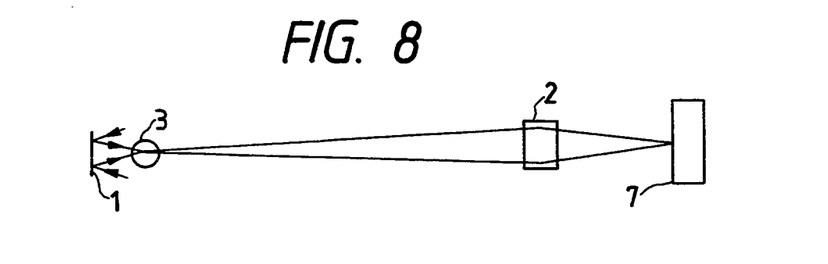
FIG. 8 is an illustration which shows essential part of a bar code reader of a third embodiment.

Referring to FIG. 8, a third embodiment of the invention is shown which is different from the first embodiment in that the condenser lens 3 is arranged between the image-forming lens 2 and the bar code 1.

The light beams reflected over the lengths of bars of the code 1 are collected by the condenser lens 3 to be directed to the image-forming lens 2 along an imaging optical path so that they are focused on the image sensor 7 in the same manner as in the first embodiment.

Figure 9:
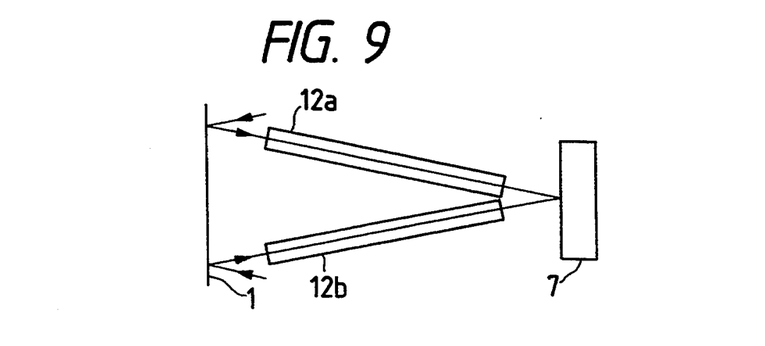
FIG. 9 is an illustration which shows essential part of a bar code reader of a fourth embodiment.

Referring to FIG. 9, a fourth embodiment is shown. The bar code reader of this embodiment includes SELFOC lenses 12a and 12b which are arranged between the bar code 1 and the image sensor 7. The SELFOC lenses 12a and 12b are so oriented that light beams reflected from areas around both ends of each bar of the code 1 are focused on a given area of the image sensor 7, with bar code images carried by the respective light beams overlapping each other.

Figure 10:
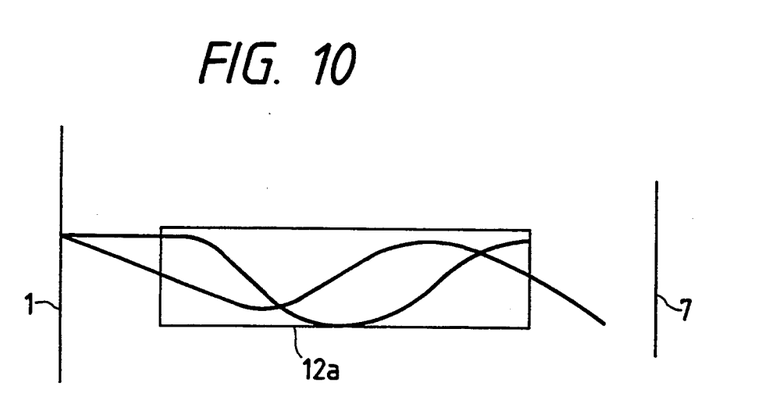
FIG. 10 is a cross-sectional view which shows optical characteristics of a SELFOC lens.
Figure 11:
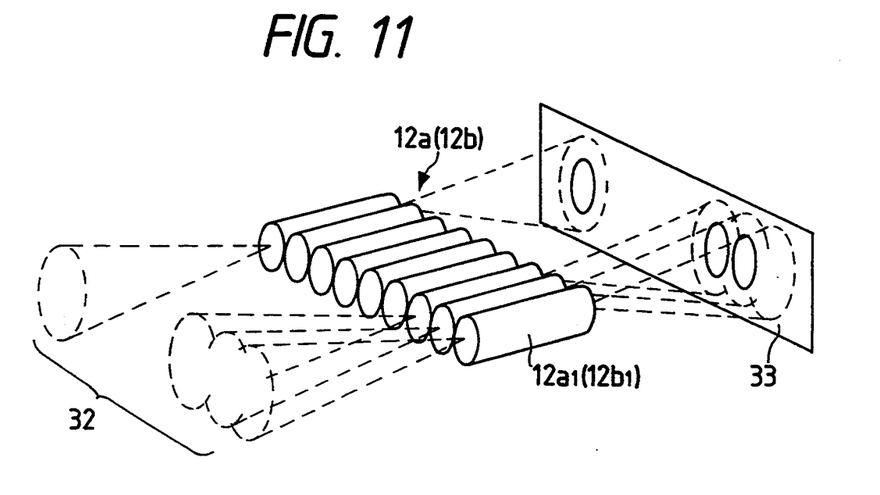
FIG. 11 is a perspective view which shows arrangements of cylindrical lens forming a SELFOC lens.

In FIG. 9, the light beams passing through the SELFOC lenses 12a and 12b are illustrated so as to advance straight, respectively for the sake of simplicity, however, they actually meander through the SELFOC lenses, as shown in FIG. 10, toward the image sensor 7. This is because the SELFOC lenses 12a and 12b are so designed that a refractive index is increased in a radial direction from the center. Each of the SELFOC lenses 12a and 12b, as shown in FIG. 11, includes a plurality of rod lens 12a1 (12b1) which are arranged in parallel with each other so that all images of the bars of the code 1 over a range illustrated at numeral 32 are projected onto an area 33 of the image sensor 7.

Figure 12:
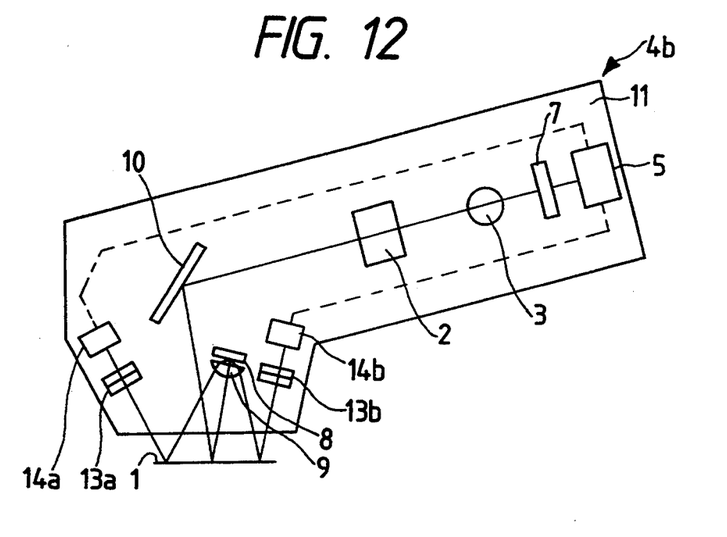
FIG. 12 is an illustration which shows a fifth embodiment of a bar code reader of the invention.

Referring to FIG. 12, a fifth embodiment is shown wherein a determination function for determining if the bar code are read upside down in a lengthwise direction thereof, is added to the same arrangements as in the first embodiment.

Generally, even though a bar code is mistakenly arranged reversely in a lengthwise direction, it may be read without any error based on light beams reflected over the lengths of bars of the code. In this case, a problem is encountered in that the bars of the code are read in a reverse order over the widths thereof, resulting in erroneous bar code information being detected. For eliminating this problem, a bar code reader 4b according to the fifth embodiment has a means for determining whether the bar code is oriented correctly or not. While in this embodiment, the determining means is incorporated into the same arrangements as in the first embodiment, it also applicable to the above mentioned second, third, and fourth embodiments.

Figure 13:
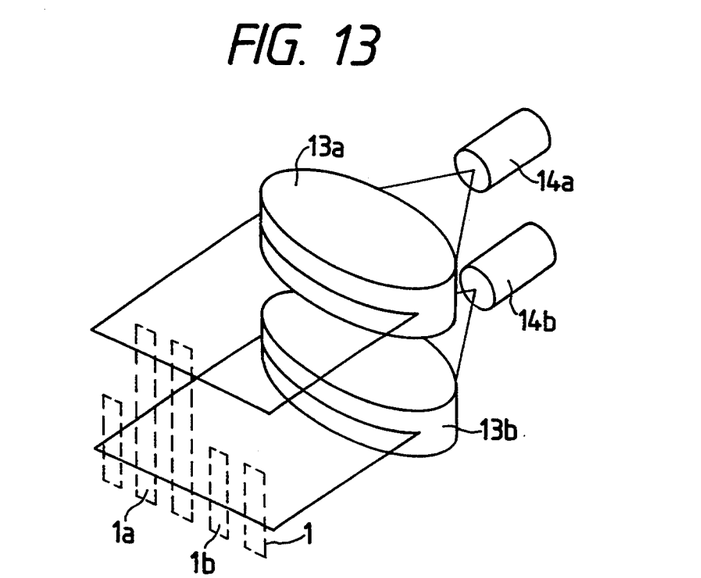
FIG. 13 is a perspective view which shows phototransistors and condenser lens which serve to determine if a bar code is placed upside down in a lengthwise direction thereof.

The bar code reader 4b, as shown in FIG. 12, includes a pair of condenser lenses 13a and 13b made of an elliptic cylinder and phototransistors 14a and 14b functioning as a non-dimensional photoelectric converter. The condenser lenses 13a and 13b are, as shown in FIG. 13, arranged at a preselected interval in a lengthwise direction of the bars of the code 1. The phototransistors 14a and 14b are optically oriented toward the condenser lens 13a and 13b, respectively.

In the event that the bar code 1 is arranged in proper order, the condenser lens 13a receives light reflected from upper portions of the long bars 1a to direct it to the phototransistor 14a, while the condenser lens 13b receives light reflected from both the short bars 1b and lower portions of the long bars 1a to direct it to the phototransistor 14b. The reflected light entering the phototransistor 14a shows a higher intensity than the reflected light entering the phototransistor 14b because the light received by the phototransistor 14a is reflected from a low-reflectivity area only the upper portions of the long bars 1a occupies.

With the above arrangement, when the LED module 8 emits light beams toward the bar code 1 through the lighting lens 9, the light beams reflected by the bar code 1 go to the image-forming lens 2 through the mirror 10, while they are also propagated onto the phototransistors 14a and 14b through the condenser lenses 13a and 13b.

Figure 14:
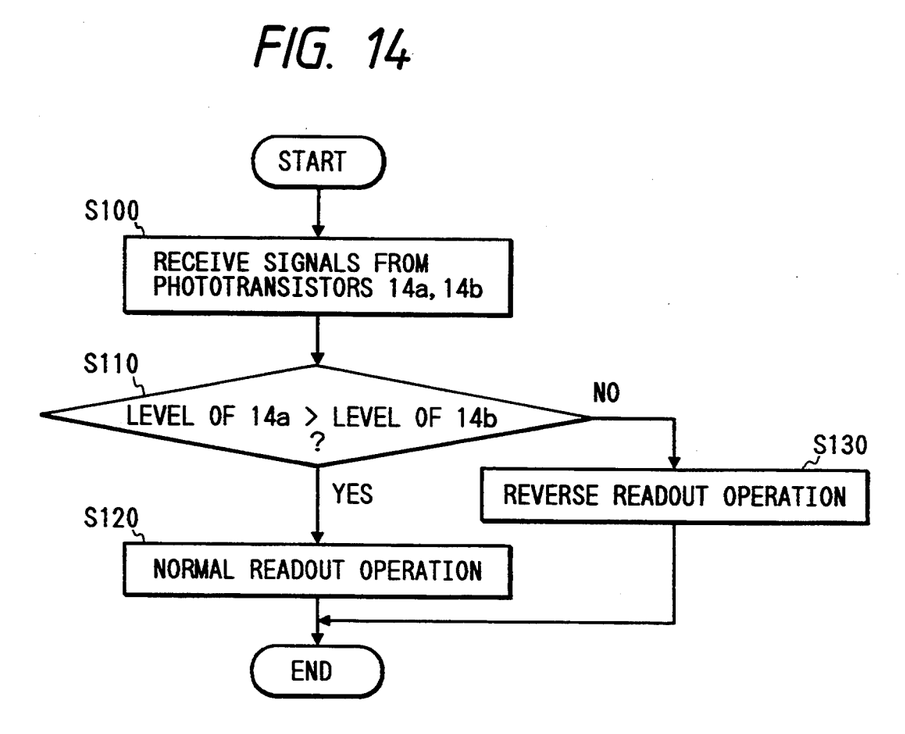
FIG. 14 is a flowchart which shows a program performed by an ECU according to a fifth embodiment.

FIG. 14 shows a flowchart of a program or sequence of logical steps performed by the ECU 5. The phototransistors 14a and 14b are responsive to the light beams reflected form the bar code 1 to provide signals indicative thereof. The ECU then receives the signals from the phototransistors 14a and 14b in step 100. Subsequently, in step 110, it is determined whether a level of the signal from the phototransistor 14a is greater than that from the phototransistor 14b or not. At this time, if the bar code is oriented correctly, the level of the signal from the phototransistor 14a becomes higher than that of the phototransistor 14b because the light received by the phototransistor 14a is reflected from the low-reflectivity area only the upper portions of the long bars 1a occupies. Therefore, when the bar code is oriented correctly, a YES answer is obtained in step 110. The routine then proceeds to step 120 wherein an bar code-readout operation is allowed so that the read bar code information is inputted directly to the external devices. Alternatively, when the phototransistor 14b provides a higher level of signal, a NO answer is obtained in step 110. The routine then proceeds to step 130, concluding that the bar code 1 is placed at incorrect orientation, that is, that the bars of the code are arranged upside down in a lengthwise direction thereof. In step 130, scanning is performed in a direction opposite that in a normal scanning operation in step 120 so that the bar code information may be read correctly.

In the fifth embodiment, as described above, the bar code-orientation determination is made based on the reflected light from a preselected number of bars, preferably five bars. Usually, in a postal bar code employed in the postal network system, at most four long bars are so arranged adjacent each other that at least one short bar, which will cause an output signal from the phototransistor 14a to be change in level, exists in an array of five bars. Therefore, it is desirable that the condenser lenses 13a and 13b be designed to collect light reflected from an area ranging at least five adjacent bars.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, in the above embodiments, the LED module 8 is arranged as a light source, however, it may alternatively be provided with another suitable lighting means such as an electric lamp. Additionally, in place of a built-in lighting source, an external lighting source may be used. Further, the decoder 21 may be arranged in an external device.

What is claimed is:

1. A bar code reading apparatus comprising:
   light radiating means for radiating light onto a bar code, the bar code including long and short bars which are separated by spaces, a combination of lengths of the bars representing information;
   light gathering means for gathering the light reflected from the bar code and for compressing the gathered light at a preselected rate in a lengthwise direction of the bars;
   one-dimensional photoelectric conversion means, responsive to the light compressed by the light gathering means, for generating a converted signal having a level corresponding to a degree of intensity of the compressed light, portions of the converted signal representing the short bars, the long bars, and the spaces; and
   bar code information readout means, responsive to the converted signal generated by the one-dimensional photoelectric conversion means, for reading the information carried by the bar code, where the bar code information readout means include means for discriminating between the portion of the converted signal corresponding to the bars and the portion of the converted signal corresponding to the spaces, for removing portion of the converted signal which corresponds to the spaces, and for reading out the information represented by the bar code by discriminating between portions of the converted signal which correspond to the long bars and the short bars.

2. A bar code reading apparatus as set forth in claim 1, wherein the light gathering means includes a cylindrical condenser lens with its center line being arranged perpendicular to the lengths of the bars of the bar code.

3. A bar code reading apparatus as set forth in claim 2, wherein the photoelectric conversion means includes a plurality of light-sensitive elements which are arranged in line parallel to the center line of the cylindrical condenser lens.

4. A bar code reading apparatus as set forth in claim 1, wherein the light gathering means includes a plurality of cylindrical condenser lenses which are arrange between the bar code and an optical system of the photoelectric conversion means in a manner wherein the center lines of the cylindrical condenser lenses are arranged in parallel to an array of the bars of the bar code.

5. A bar code reading apparatus as set forth in claim 1, wherein the light gathering means include a pair of cylindrical condenser lenses, the photoelectric conversion means including a plurality of light-sensitive elements which are arranged in line parallel to the center lines of the cylindrical condenser lenses.

6. A bar code reading apparatus as set forth in claim 1, wherein the bar code information readout means include:
   detecting means for detecting variation points from the converted signal and for generating a variation signal indicative of the variation points, the variation points occurring at transitions between portions of the converted signal corresponding to the bars and a portions of the converted signal corresponding to the spaces;
   pulse generating means for generating a pulse signal, the pulse signal maintaining a first level for a predetermined period of time after each of the variation points; and
   sample-hold means for receiving the pulse signal and the converted signal and for generating a sample-hold signal which is based on the converted signal, the sample-hold signal maintaining, for an amount of time defined by the pulse signal, a second level which corresponds to the portion of the converted signal that is indicative of the bars.

7. A bar code reading apparatus comprising:

light radiating means for radiating light onto a bar code, the bar code including long and short bars which are separated by spaces, a combination of lengths of the bars representing information;

light gathering means for gathering the light reflected from the bar code and for compressing the gathered light at a predetermined rate in a lengthwise direction of the bars;

one-dimensional photoelectric conversion means, responsive to the light compressed by the light gathering means, for generating a converted signal having a level corresponding to a degree of intensity of the compressed light, portions of the converted signal representing the short bars, the long bars, and the spaces;

removing means for discriminating between a portion of the converted signal corresponding to the bars and a portion of the converted signal corresponding to the spaces, and for removing the portion of the signal corresponding to the spaces; and bar code information read out means for reading out the information represented by the bar code by discriminating between the long bars and the short bars according to the levels of the portions of the converted signal.

8. A bar code reading apparatus comprising:

light radiating means for radiating light onto a bar code including a plurality of bars which carry information represented by a combination of lengths of the bars;

light gathering means for gathering the light reflected from the bar code to compress the gathered light at a preselected rate in a lengthwise direction of the bars;

photoelectric conversion means, responsive to the light compressed by the light gathering means, for providing a signal having a level corresponding to a degree of intensity of the compressed light;

bar code information readout means, responsive to the signal from said photoelectric conversion means, for reading the information carried by the bar code; and determining means for determining an orientation of the bars of the bar code and for generating a signal indicative thereof.

9. A bar code reading apparatus as set forth in claim 8, wherein the bar code includes a combination of long and short bars, the determining means include:

light gathering means having a first element for receiving a portion of the reflected light from only an upper portion of the long bars and a second element for receiving a portion of the reflected light from lower portions of the long and short bars, photoelectric means for generating first and second signals which have levels corresponding to the portions of the reflected light respectively received by the first and second elements, and comparing means for comparing a level of the first signal with a level of the second signal to determine if the bars of the bar code are oriented in a given direction.

10. A bar code reading apparatus as set forth in claim 9, wherein the light gathering means is arranged to receive a portion of the reflected light corresponding to an area on which at least five bars are placed.

11. A bar code reading apparatus comprising:

light radiating means for radiating light onto a bar code, the bar code including long and short bars which are separated by spaces, a combination of lengths of the bars representing information;

light gathering means for gathering the light reflected from the bar code and for compressing the gathered light at a preselected rate in a lengthwise direction of the bars;

one-dimensional photoelectric conversion means, responsive to the light compressed by the light gathering means, for generating a converted signal, portions of the converted signal being one of a first, second, and third level which are different from each other, the first level corresponding to the long bars, the second level corresponding to the short bars, the third level corresponding to the spaces; and bar code information read out means for reading out the information represented by the bar code based on the converted signal generated by the one-dimensional photoelectric conversion means.

12. A bar code reading apparatus as set forth in claim 11, wherein the first level of the signal generated by the one-dimensional photoelectric conversion means is lower than the second level, the third level being higher than the second level.

13. A bar code reading apparatus comprising:

light gathering means for gathering light reflected from a bar code and for compressing the gathered light at a preselected rate in a lengthwise direction of the bars, the bar code including long and short bars which are separated by spaces, a combination of lengths of the bars representing information;

one-dimensional photoelectric conversion means, responsive to the light compressed by the light gathering means, for generating a converted signal having a level corresponding to a degree of intensity of the compressed light, portions of the converted signal representing the short bars, the long bars, and the spaces; and bar code information readout means, responsive to the converted signal from the one-dimensional photoelectric conversion means, for discriminating between the portion of the converted signal corresponding to the bars and the portion of the converted signal corresponding to the spaces, for removing the portion of the converted signal corresponding to the spaces, and for reading out the information represented by the bar code by discriminating the long bars and the short bars based on the levels of the portions of the converted signal.

14. A bar code reading apparatus comprising:

light gathering means for gathering light reflected from a bar code and for compressing the gathered light at a preselected rate in a lengthwise direction of the bars, the bar code including long and short bars which are separated by spaces, a combination of lengths of the bars representing information;

one-dimensional photoelectric conversion means, responsive to the light compressed by the light gathering means, for generating a converted signal having a level corresponding to a degree of intensity of the compressed light, portions of the converted signal representing the short bars, the long bars, and the spaces; and removing means for discriminating between a portion of the converted signal corresponding to the bars and a portion of the converted signal corresponding to the spaces, and for removing the portion of the signal corresponding to the spaces; and bar code information read out means for reading out the information represented by the bar code by discriminating between the long bars and the short bars based on the levels of the portions of the converted signal.

15. A bar code reading apparatus comprising:

light gathering means for gathering light reflected from a bar code and for compressing the gathered light at a preselected rate in a lengthwise direction of the bars, the bar code including long and short bars which are separated by a space, a combination of lengths of the bars representing information;

one-dimensional photoelectric conversion means, responsive to the light compressed by the light gathering means, for generating a converted signal, portions of the converted signal being one of a first, second, and third level which are different from each other, the first level corresponding to long bars, the second level corresponding to short bars, the third level corresponding to the spaces; and bar code information read out means for reading out the information represented by the bar code based on the converted signal generated by the one-dimensional photoelectric conversion means.

16. A bar code reading apparatus as set forth in claim 15, wherein the first level of the signal generated by the one-dimensional photoelectric conversion means is lower than the second level, the third level being higher than the second level.

17. A bar code reading apparatus comprising:

light radiating means for radiating light onto a bar code, the bar code including long and short bars which are separated by spaces, a combination of lengths of the bars representing information;

light gathering means for gathering the light reflected from the bar code and for compressing the gathered light at a preselected rate in a lengthwise direction of the bars;

one-dimensional photoelectric conversion means, responsive to the light compressed by the light gathering means, for generating a converted signal varying over a range of first, second, and third levels according to a degree of intensity of the compressed light, the first level corresponding to the spaces between the bars, the second level corresponding to the short bars, the third level corresponding to the long bars; and bar code information readout means for reading out the information represented by the bar code, the bar code information readout means generating first and second signals based on the converted signal generated by the photoelectric conversion means, the first signal having a first bar code level in response to an increase in the level of the converted signal to a second level from a first level followed by a decrease from the second level to the first level, the second signal having a second bar code level in response to an increase in the level of the converted signal to a third level from the first level followed by a decrease from the third level to the first level, where the first and second signals are generated when the converted signal respectively remains at the second and third level for a given period of time.

18. A bar code reading apparatus as set forth in claim 17, wherein the bar code information readout means includes:

a follow-up signal generating circuit which generates a follow-up signal with a level following variations in the level of the converted signal, converter means for converting the follow-up signal into a digital signal, and decoding means for decoding the digital signal generated by the converter means, a comparator for comparing the converted signal with the follow-up signal and for providing a binary signal based on the comparison, a single pulse signal generating circuit, responsive to the binary signal, for producing a single pulse which is maintained at a high level for a given period of time following a variation in level of the binary signal, and a sample and hold circuit for holding the level of the follow-up signal based on the single pulse signal generated by the single pulse signal generating circuit, and for providing the first and second signals based on the held follow-up signal which have the first and second bar code levels.

* * * * *